(12) United States Patent
Monchilovich et al.

(10) Patent No.: US 6,952,717 B1
(45) Date of Patent: Oct. 4, 2005

(54) DOCUMENT AND MESSAGE EXCHANGE SYSTEM FOR ASP MODEL

(75) Inventors: Dushan G. Monchilovich, Lawrenceville, GA (US); Joshua D. Burt, South Burlington, VT (US); Daniel T. Fossi, Georgia, VT (US); Dwayne Allen Emerick, Alpharetta, GA (US); Matthew E. Wheelis, Marietta, GA (US)

(73) Assignee: Emerging Solutions, Inc., Alpharetta, GA (US)

( * ) Notice: Subject to any disclaimer, the term of this patent is extended or adjusted under 35 U.S.C. 154(b) by 882 days.

(21) Appl. No.: 09/693,781

(22) Filed: Oct. 20, 2000

(51) Int. Cl.[7] .............................................. G06F 15/16
(52) U.S. Cl. ....................... 709/205; 709/212; 709/213; 707/201; 715/733
(58) Field of Search ............................. 709/212, 213, 709/226, 204, 205; 707/102

(56) References Cited

U.S. PATENT DOCUMENTS

| | | | | |
|---|---|---|---|---|
| 5,115,504 A | * | 5/1992 | Belove et al. | ............... 707/100 |
| 5,715,454 A | * | 2/1998 | Smith | .......................... 707/203 |
| 5,958,004 A | * | 9/1999 | Helland et al. | .............. 718/101 |
| 6,301,601 B1 | * | 10/2001 | Helland et al. | .............. 718/101 |
| 6,330,566 B1 | * | 12/2001 | Durham | .................... 707/104.1 |
| 6,363,413 B2 | * | 3/2002 | Kidder | ......................... 709/203 |
| 6,421,678 B2 | * | 7/2002 | Smiga et al. | ................ 707/102 |
| 6,678,696 B1 | * | 1/2004 | Helland et al. | .......... 707/103 R |

* cited by examiner

Primary Examiner—Hosain Alam
Assistant Examiner—Liang-che Wang
(74) Attorney, Agent, or Firm—King & Spalding LLP

(57) ABSTRACT

Document and message exchange can be facilitated using a Application Service Provider model. Assigning unique identifiers for data fields allows multiple databases to exchange information using relational databases. A project can be initiated and participants invited to collaborate using a distributed computing environment, such as the global Internet. Participants retain ownership of information by selecting the information to be shared, and optionally storing their information on databases restricted to them. Information is routed between collaborators using unique identifiers. Unique identifiers and their corresponding data fields can be mapped to a user's local computing area. Changes in documents and responses to documents can be monitored by inserting new records reflecting the changes into document tables.

34 Claims, 15 Drawing Sheets

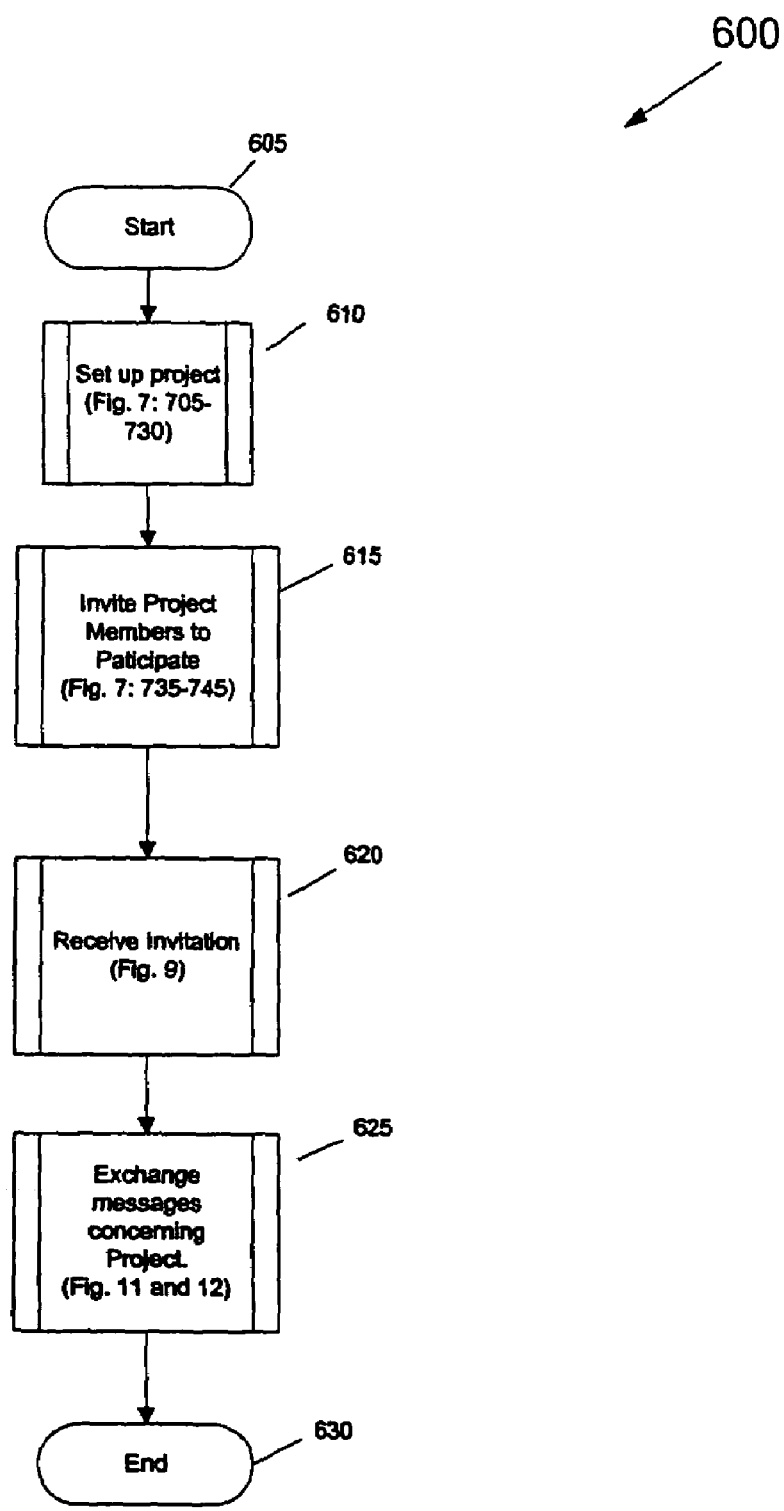
High Level View — Fig. 6

DOCUMENT AND MESSAGE EXCHANGE SYSTEM FOR ASP MODEL

TECHNICAL FIELD

The present invention relates to computer systems for storing and exchanging information. More particularly, the present invention relates to computer systems that utilize the Internet to send and receive information using an Application Service Provider to facilitate collaboration on shared projects.

BACKGROUND OF THE INVENTION

The exchange of information between parties collaborating on joint projects has traditionally suffered from the limitations of the mode of exchange. During the time it takes for one party to deliver a document detailing that party's activities, several other collaborators may have contemporaneously engaged in activity on the project that drastically affects the first party's business interests. Similarly, the content of the information exchanged between some parties may be critically sensitive. A party may desire to share limited information with specific parties while preventing the distribution of that information with other collaborators. In such circumstances, retaining ownership of one's information is paramount.

One example of an industry in which collaboration on projects is integral to a successful business is the construction industry. In the construction business several subcontractors compete for opportunities to collaborate on construction projects under the supervision of a general contractor. A subcontractor must disclose project information to the general contractor and must constantly be updated on the progress of the project and of other subcontractors working on the same project. Information specific to one subcontractor must be shared with the general contractor but may be detrimental if shared with competing subcontractors. Thus, ownership of confidential information is critical in the construction industry. Because timing is critical in completing the construction projects, subcontractors must be aware of events as they occur during the life of the project.

Computers have greatly affected many industries by facilitating information management. Many industries are storing vast amounts of information in computers; however, the information is not readily accessible to multiple collaborators on multiple projects. Conventional approaches aimed at facilitating information exchange include having multiple project participants transmit information to a single individual. FIG. 1 is a block diagram of this approach. In FIG. 1 the subcontractors 125–135, architect 110, general contractor 115, and the engineer 120 transmit information relating to the project to a central database 105. An individual would then input the received data into a local computer. Access to the information would necessarily be through the one person entering the data into the computer. As a result, access to information by persons other that the person inputting the data is severely limited. Real-time availability of information is simply not possible in this scenario. Similarly, the information is specific to one project. A subcontractor working on multiple projects would have limited, if any, access to information on that one project and no ability to simultaneously access information on an enterprise level. Finally, sensitive data released to the individual inputting the information into a computer may no longer be the exclusive property of the individual transmitting the information. The issue of ownership of confidential business information is critically important because it allows one to regulate who has access to the data. Failing to retain ownership of the data may compromise competitiveness because once ownership of the data is lost, the ability to restrict access to the data is also lost.

Storing project information in a central database that permits collaborators to access the database remotely is an alternative conventional method of addressing the issue of data exchange between collaborators and is illustrated in FIG. 2. In this scenario, users 205 can remotely input project information from their own computer into a product provider system 215. For example, a subcontractor can establish contact remotely with the database using a computer with a modem coupled to conventional telephone lines and an interface 210. Once the contact is established, the subcontractor can transmit project data directly into the product provider system 215. The data can then be processed on the system containing the database 215. The information flows from the user 205 to the database 215 through an interface 210. This system has several disadvantages. Using this system, a collaborator cannot receive messages or information directly from other collaborators. The system manages information on a project specific basis. The information is generally available to collaborators in a "read-only" format. Because this system typically does not utilize a relational database, specific data structures must be used for archive and access purposes.

FIG. 3 is another example of a method of exchanging information between collaborators. The method of FIG. 3 allows users 305 to access a server 315 via the Internet 310 that manages as well as stores project information. This method is an example of using an Application Service Provider (ASP). ASPs range from simple free e-mail services to complex custom applications. An application resides on the ASP's Web site and, whenever the application is needed, it is accessed through a Web browser. Information is saved either to the ASP's server or to a local hard drive. Using this conventional method, information stored on the server 315 can relate to one or more projects but the information does not remain under the exclusive control of a collaborator. When multiple collaborators upload project information to a single database, the ownership of the data stored on the central database is unclear, and restricting access to confidential business information remains a problem. Once the project is completed, the stored information is typically no longer accessible by all collaborators because the application does not permit access to completed projects.

Conventional methods of exchanging information between multiple collaborators on multiple projects fail to adequately protect confidential business information, do not provide real-time information to collaborators, and lack the capacity to manage information for a single collaborator across multiple projects. Accordingly, there is a strong need in the art for a method and system to protect confidential business information during the exchange of information between collaborators. A further need exists for a method and a system for exchanging information between collaborators that facilitates the exchange of information between multiple databases using dynamic relational databases via an Application Service Provider model. There is an additional need in the art for a method and a system for exchanging information between collaborators that monitors changes made to documents by collaborators as the documents are exchanged. Another need exists for a method and system of exchanging information that enables a collaborator to access real-time information on a project. Yet another need exists in the art for a method and system of exchanging information between collaborators that enables a single collaborator to exchange information and monitor such exchanges for all of that collaborator's projects.

SUMMARY OF THE INVENTION

The present invention solves the aforementioned problems by facilitating collaboration on projects using an ASP model. Ownership of information is preserved by optionally storing confidential information on databases owned by the original owner of the data. Alternatively, information to be shared is selected by the owner of the information and transmitted directly to a selected recipient. Messages and documents can be exchanged directly between collaborators rather than stored at a central repository. Additionally, the present invention enables an individual to participate in multiple projects with different collaborators. A user can generate reports and extract data on an enterprise level rather than be limited to a single project. The status of projects is available as collaborators exchange information on projects.

The present invention supports the execution of an application on a Web server that is accessed by client computers via the Internet. A database can be connected to the Web server. This database, called the Global Information Store (GIS), houses data fields that are associated with Global Unique Identifiers (GUIDs). GUIDs play a central role in facilitating the exchange of information between clients or their databases. GUIDs inject a commonality between databases despite differences in the content of the data fields. For example, a data field containing information that a message is "pending" can be given a GUID of 101. If a second database has "pend" in its data field having a GUID of 101, a message received by the second database containing "pending" in that data field will be understood to mean "pend." Thus, the present invention can provide a common key to translate data fields between databases. The key can be a number, a character, a combination of characters and numbers, or any other data type. When a client computer creates a project using specific data fields, the client publishes the data fields to the GIS to associate a GUID with each data field. The GUIDs are returned to the client computer or database and are associated with the specific data fields.

Once the data fields of a project are associated with GUIDs, a client can send invitations to other clients to participate in the project. The invitation contains data fields relating to the project. After receiving the invitation and accepting the message, the invitee checks to see if the project of the invitation exists on the invitee's local computer or database. This determination can be accomplished by checking whether the GUID of the project of the invitation is stored locally. If the project is not stored locally, the invitee can import the project data with the associated GUIDs from the GIS. If the project exists in the invitee's local computer or database, the project data can be compared with the local data relating to the project. Possible matches can be displayed to the user, and the user can select the data field of the invitation that corresponds to the local data field by matching the GUID of the data field of the project with the local data field. This process can continue until all the data fields of the invitation correspond to local data fields sharing the same GUIDs. This process of matching data fields in messages or invitations to local data fields is termed "mapping."

The present invention facilitates the exchange of messages and documents between collaborators by associating a GUID with each collaborator or contacts for a collaborator. The routing information associated with the collaborator's GUID can be stored in the GIS. When a message is sent, the GIS can be queried for either the routing information corresponding to the GUID of the addressee or for the GUID and routing information of an addressee. The routing information can then be inserted into the message and the message sent.

In addition to facilitating the exchange of messages and documents, the present invention can generate history logs showing the modification of documents and messages as they are exchanged among collaborators. Each document and message contains tables in which a record is added each time the document is edited or acted upon. Related documents contain document history tables that reflect changes made to the parent document as well as the parent document's child documents.

That the invention improves over prior systems for exchanging information between collaborators and accomplishes the advantages and goals described above will become apparent from the following detailed description of the exemplary embodiments and the appended drawings and claims.

BRIEF DESCRIPTION OF THE DRAWINGS

FIG. 6 is a logic flow diagram illustrating an exemplary embodiment of a method for exchanging information between collaborators in an ASP model.

DETAILED DESCRIPTION OF EXEMPLARY EMBODIMENTS

Figure 1:
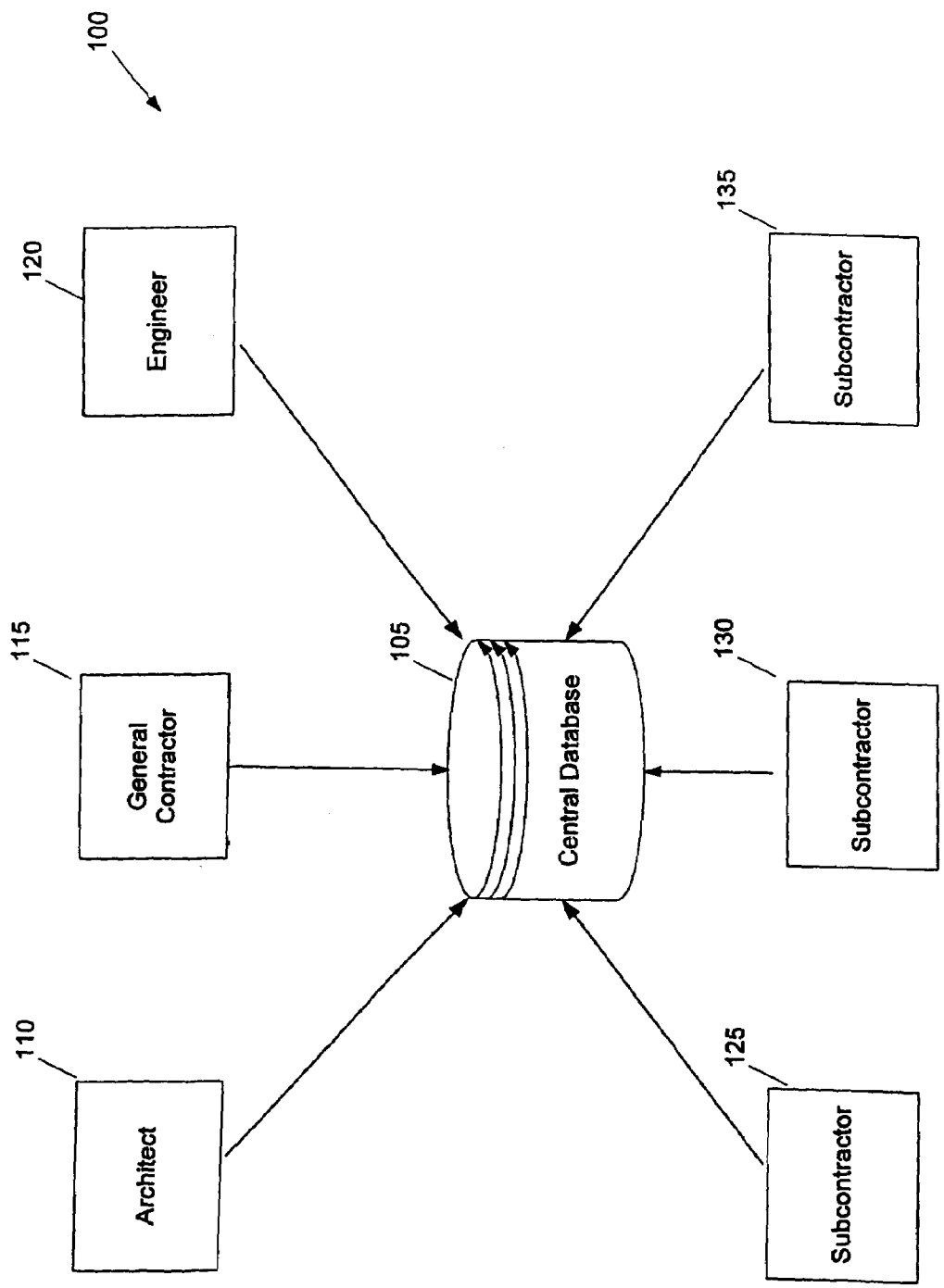
FIG. 1 is a block diagram of a conventional method of exchanging information between collaborators in the construction industry based upon manual entry of each collaborator's information.
Figure 2:
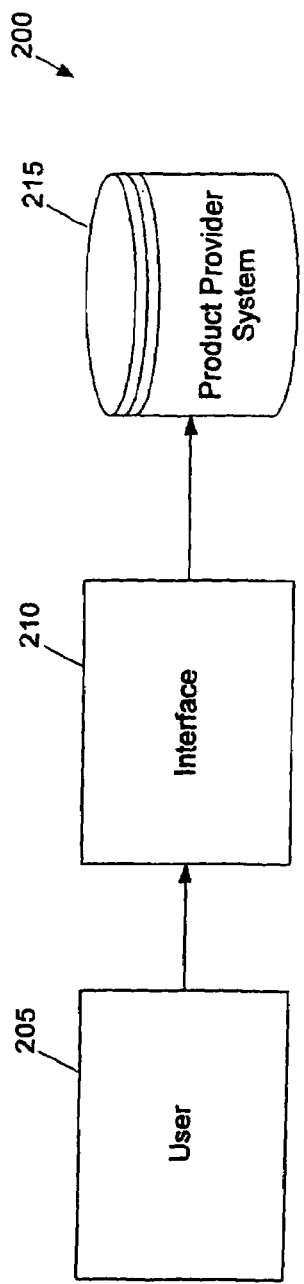
FIG. 2 is a block diagram of another conventional method of exchanging information in which a collaborator can remotely access a central database and store information on that system.
Figure 3:
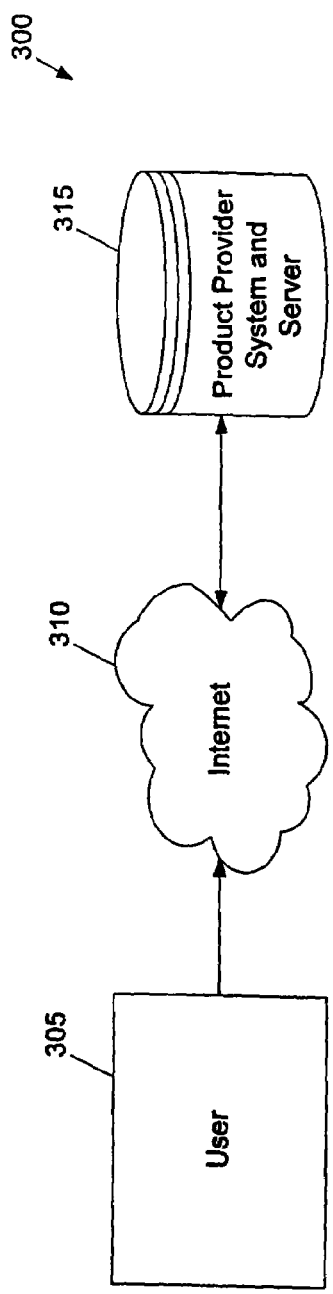
FIG. 3 is a block diagram of a conventional method of exchanging information between collaborators that can upload project information to a central database by accessing the Internet.

The present invention is directed toward a system for exchanging information between collaborators using an ASP model. An ASP model includes but is not limited to a model wherein a application is hosted on server which can be accessed by the Internet. In a preferred embodiment, the present invention may be embodied in a computer program, typically an application program running on a Web server that facilitates the exchange of information between collaborators on a project. In another preferred embodiment, the project is in the construction industry. Although the illustrative embodiment will be generally described in the context of an application running on a Web server, otherwise known as an Application Service Provider (ASP) model, those skilled in the art will recognize that the present invention may be implemented in any distributed computing environment including local are networks, wide area networks, as well as the Internet.

The detailed description which follows is represented largely in terms of processes and symbolic representations of operations by conventional computer components, including client computers, memory storage devices, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by a central processing unit via a communications network.

The processes and operations performed by the computer include the manipulation of signals by a client or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and illustrative operating environment will be described.

Figure 4A:
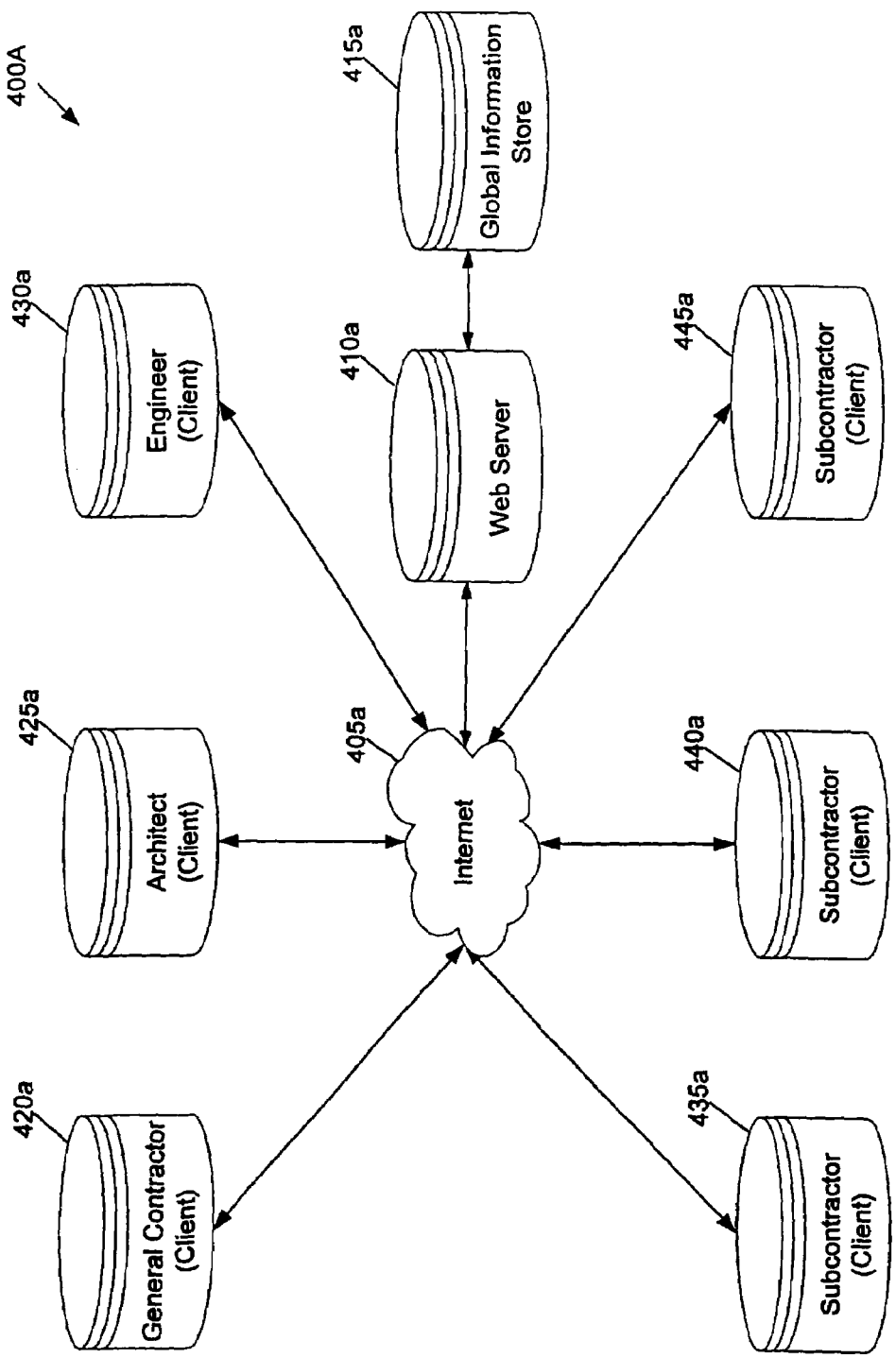
FIG. 4A is a block diagram of one embodiment of the present invention in which collaborators can exchange information directly between each other's databases by accessing the Internet and a Web Server.

Referring now to FIG. 4A, an architecture of an exemplary embodiment of the present invention will be described. FIG. 4A illustrates an exemplary message and document exchange system 400A that includes a server 410a, client databases 420a–445a, which can be linked to the server 410a via the Internet 405a and database 415a connected to the server 410a. The database 415a, alternatively described as a Global Information Store (GIS) contains routing, addressing, mapping, and project information, but does not contain or store confidential business information. Information in the form of documents or messages can be exchanged between databases 420a–445a through the Internet 405a to the server 410a. The server 410a optionally queries the database 415a as needed to retrieve routing, addressing, or mapping information necessary to deliver the information to the specified addressee database. Unlike system 300 system 400A can exchange information on multiple projects for each client.

In a typical operating environment in the construction industry, a general contractor 420a publishes project specific data to the GIS 415a via the Internet 405a. Each data field in the project setup message or document is given a GUID that is returned to the general contractor 420b. The general contractor 420b can then invite participants by sending a message to selected participants via the Internet 405a. Routing information for the selected participants can be retrieved from the GIS 415a. Subcontractors 435a–445a or other clients who receive and accept invitations to participate in the project can publish additional information to the GIS 415a if necessary, and exchange information with the general contractor 420a, architect 425a, engineer 430a, or other subcontractors 435a–445a. Architect 425a and engineer 430a can also exchange information with other project participants. Each client can monitor projects on an enterprise basis for all projects of the client. Additionally, clients can get project status updates as the information is exchanged.

Figure 4B:
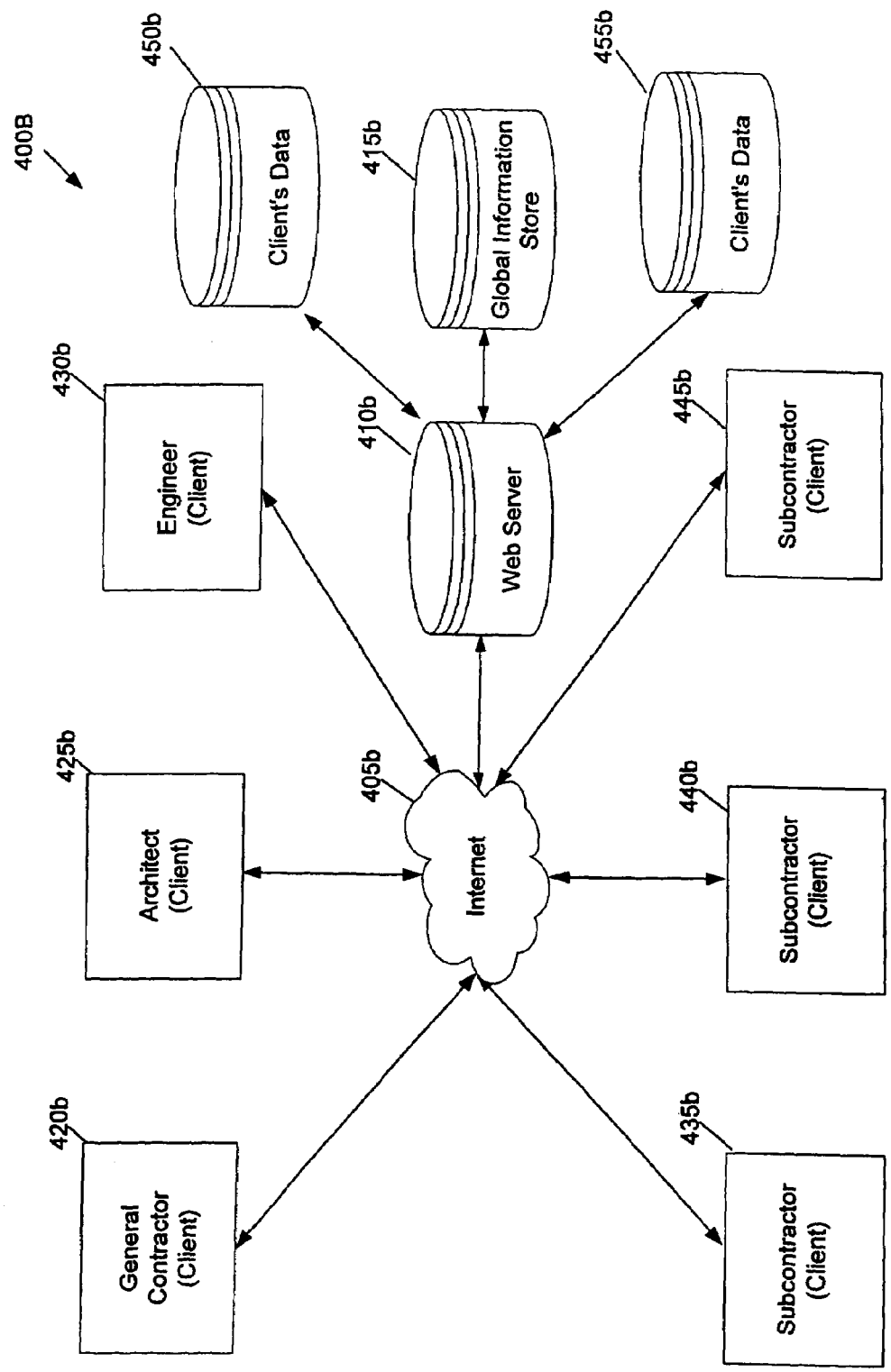
FIG. 4B is a block diagram of another embodiment of the present invention in which collaborators exchange project specific information by accessing the Internet and a Web Server wherein each collaborator's information is separately maintained on a database.

FIG. 4B illustrates an alternative embodiment of the present invention. The message and document exchange system 400B comprises a Web server 410b connected to specific client databases 450b and 455b. Clients 420b–445b can be connected to the server 410b via the Internet 405b. Clients 420b–445b can exchange documents and messages with one another through the Internet 405b to the server 410b which queries the database 415b to obtain routing, mapping, and addressing information as needed. The server 410b then directs the information to the designated addressee. Client databases 450b and 455b may be used to store the clients' proprietary information. Because client's information can be securely stored on a database 450b owned by the client, the client retains ownership of its information. In this embodiment clients can access the Web server 410b via the Internet 405b as users without maintaining a database of their own as 420a–445a in 400A.

In the construction industry, system 400B typically operates first when a general contractor 420b publishes project specific data to the GIS 415b via the Internet 405b. In this embodiment of the invention, the clients including the general contractor 420b, architect 425b, engineer 430b, and subcontractors need not operate from a local database as in system 400A. Each data field in the project setup message or document is given a GUID that is returned to the general contractor 420b. The general contractor 420b can then invite participants by sending a message to selected participants via the Internet 405b. Routing information for the selected participants can be retrieved from the GIS 415b. Subcontractors 435b–445b or other clients who receive and accept invitations to participate in the project can publish additional information to the GIS 415b if necessary, and exchange information with the general contractor 420b, architect 425b, engineer 430b, or other subcontractors 435b–445b. Architect 425b and engineer 430b can also exchange information with other project participants. In system 400B clients can optionally store information in databases 450b and 455b owned by that client. Storing information in a database owned by the client enables the client to retain ownership of its information. Information on multiple projects can be exchanged between participating clients. Each client can monitor projects on an enterprise basis for all projects of the client. Additionally, clients can get project status updates as the information is exchanged.

Figure 5:
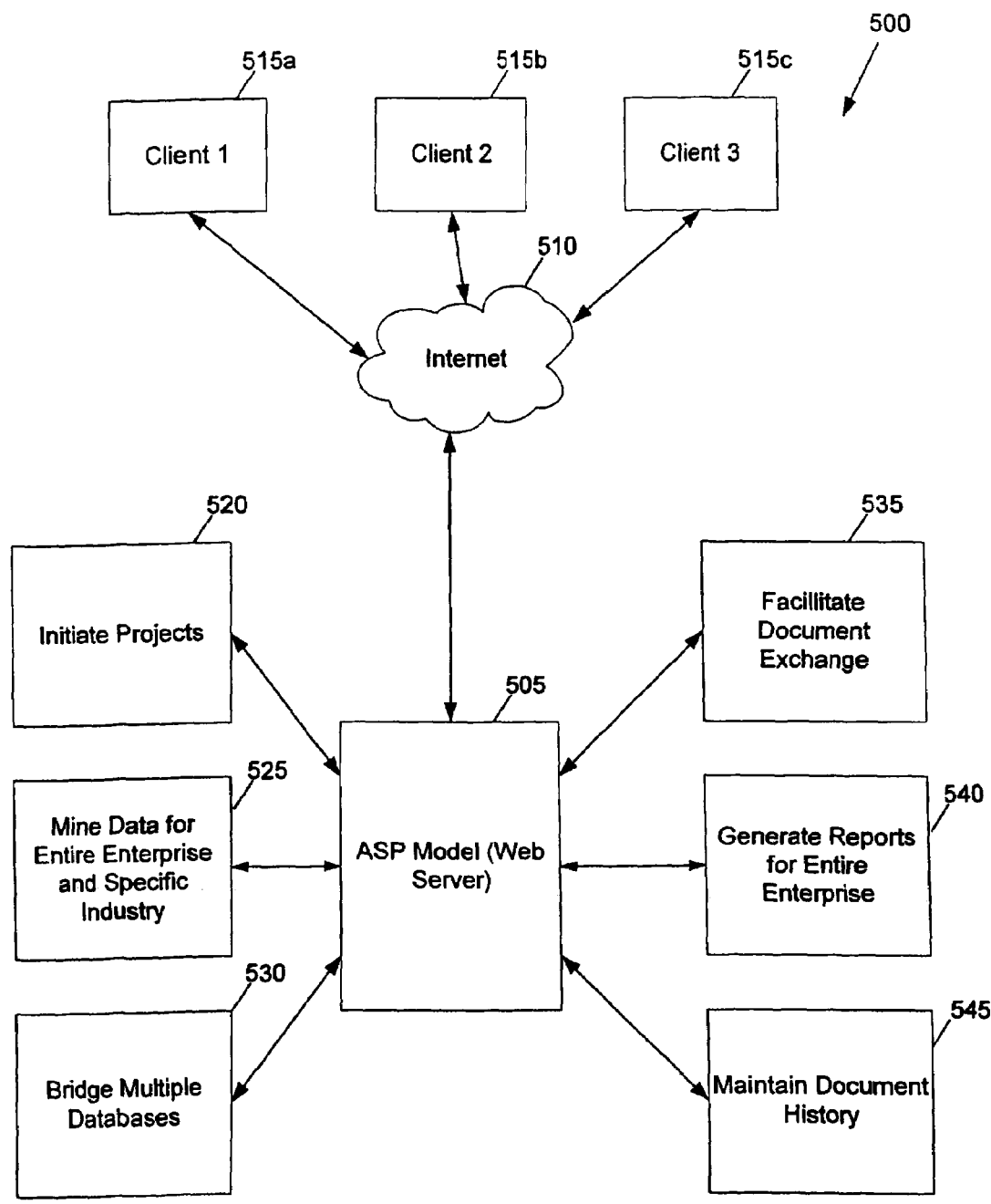
FIG. 5 is a functional block diagram illustrating an information exchange system according to one embodiment of the present invention.

FIG. 5 illustrates a functional block diagram of the exemplary components of the message and document exchange method and system 500. The message and document exchange system 500 enables multiple clients 515a –515c to exchange messages and documents by connecting to the ASP Model 505 via the Internet 510. Clients 515a–515c can initiate projects 520 using the document and message exchange system 500 as described in more detail in connection with FIG. 7. Clients 515a–515c can also mine data for their entire enterprise and specific industry 525. By mining data, it is meant that a client can obtain information from the system concerning the client's entire industry by accessing the client's own data as well as the data of other clients. Multiple clients in the same industry provide industry-wide data that can be utilized to generate industry-wide reports. The mined information can be used to assess the status of the industry, predict trends, or forecast business cycles. The message and document exchange system 500 enables clients 515a–515c to exchange information on their projects 535 and allows them to extract 525 and generate reports on an enterprise level 540. Thus, a client can determine the status of all projects on which the client is collaborating.

The message and document exchange system 500 enables clients 515a–515c to exchange information without limitation to particular data structures. Using dynamic relational databases, the exchange system 500 can bridge multiple databases 530. Additionally, the message and document exchange system 500 can track edits made in messages and documents when exchanged between collaborators. By tracking such edits, the exchange system 500 can generate a document history 545.

FIG. 6 is an exemplary logic flow diagram of a computer-implemented process for exchanging messages and documents while preserving data ownership. In routine 610, a client of the ASP sets up a specific project for collaboration. Once the project is set-up, collaborators are invited to participate in the project by using routine 615. Project initiation is explained in detail in FIG. 7A and FIG. 7B. Upon receiving an invitation to collaborate in a project, the recipient may choose to accept the invitation and participate, or reject the invitation, using routine 620. During the life of the project, collaborators exchange messages and documents in connection with the project by using routine 625.

Figure 7A:
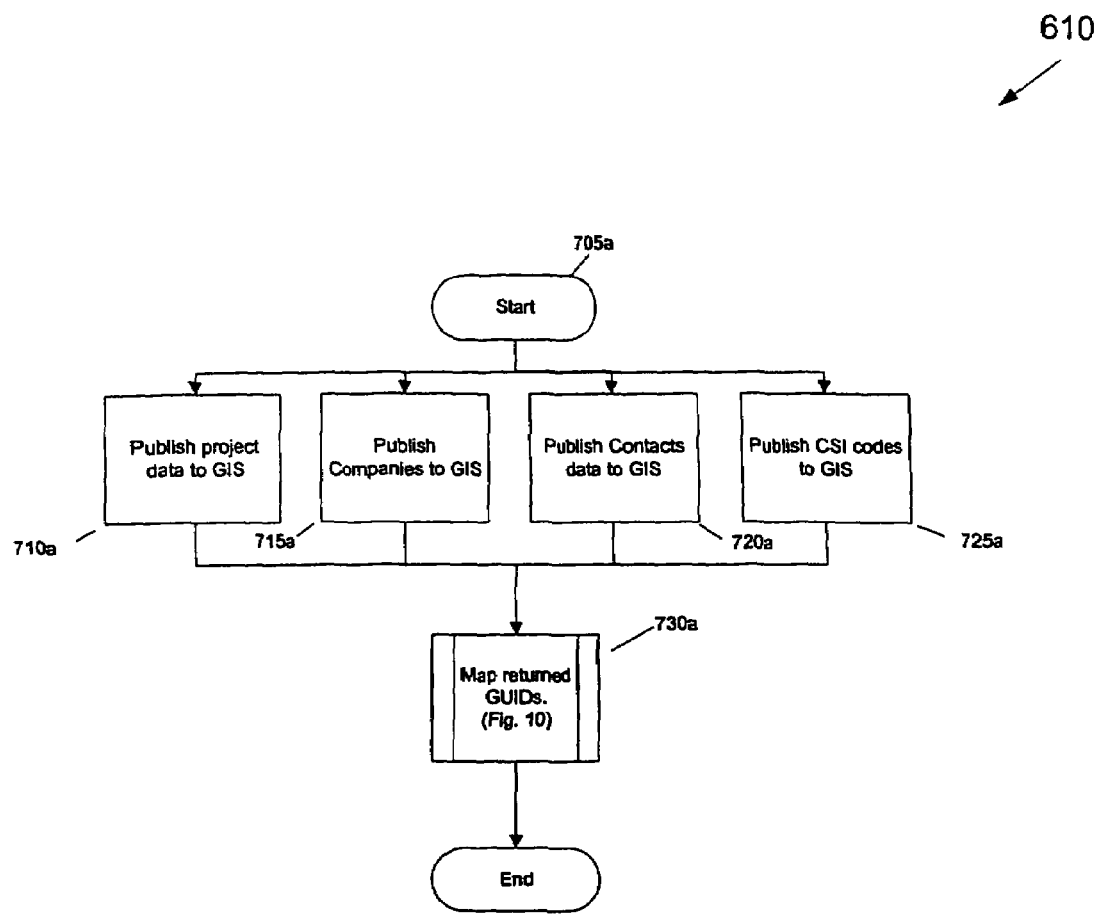
FIG. 7A is a logic flow diagram illustrating an exemplary process for initializing a project and publishing project data to a central database via and ASP model.

FIG. 7A illustrates the computer implemented process for routine 610. FIG. 7 provides an overview of routine 610 for setting up a project for collaboration by publishing project data and mapping returned global unique identifiers. Step 705 is the start step for routine 610. In steps 710a–725a project information is published to a Global Information Store (GIS) 415a or 415b. In step 710a a client can publish project data by sending the project data to the server 410a or 410b for storage at the GIS 415a or 415b. Examples of project data include the name of the project and the location of the project. In step 715a the names of specific companies to be involved in the project are published. Individual contacts involved with the project are published to the GIS in step 720a. In step 725a Construction Specifications Institute (CSI) codes are published to the GSI. CSI codes are codes used in the construction industry to identify items such as commonly used products or services in construction projects. Steps 710a–725a publish information to the GSI to facilitate exchange of information during the project. Publishing information to the GIS assigns GUIDs to each data field and enables clients to query the GIS when they encounter data fields that are not recognized locally. In the construction industry, different subcontractors can designate data fields differently on their local systems. Data fields with different designations will not be recognized by other collaborators on projects unless a reference list of data fields and GUIDs exists. The GIS provides this common list of data fields and GUIDs so that subcontractors can exchange information between different databases having data fields containing similar data but having different local designations.

All relevant fields in the document or message must be published to the GIS. Publishing project information to the GIS typically requires each data field receiving a GUID. The data fields and associated GUID are stored in the GIS so clients can query the GIS when they receive a data field that is unknown on the client's system. A determination that all relevant fields are published to the GIS is done locally. Each relevant data field is checked for the presence of a GUID. If GUID is missing from a relevant data field, the user is informed that the information must be globally published to the GIS. Publishing of information to the GIS consists of inserting the information with its supporting contextual information into the GIS.

In routine 730a the GUIDs are returned to the client setting up the project, and the GUIDs are matched locally to the corresponding data. A GUID is generated for each relevant data field and the GUID is associated with its respective data field locally. Each GUID is associated with one data field. The association between the data field and the GUID is maintained throughout the project. Matching of GUIDs with corresponding data is referred to as "mapping" and is explained in detail in process 1000 of FIG. 10.

Figure 7B:
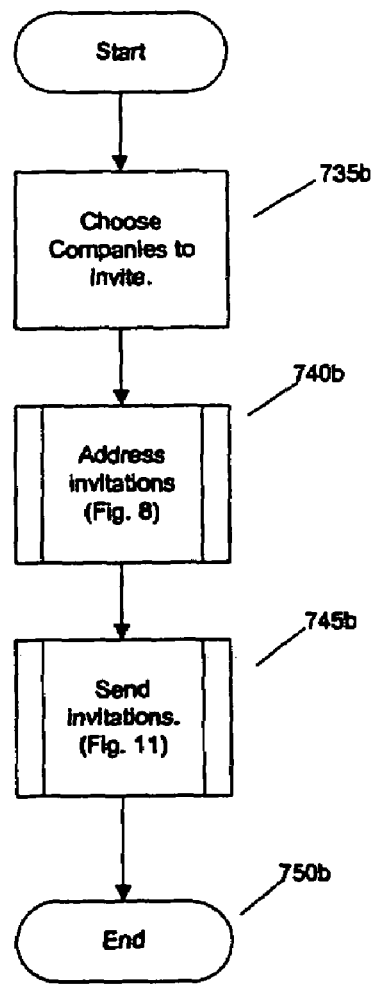
FIG. 7B is a logic flow diagram illustrating an exemplary process for inviting collaborators to participate in the project via an ASP model.
Figure 11:
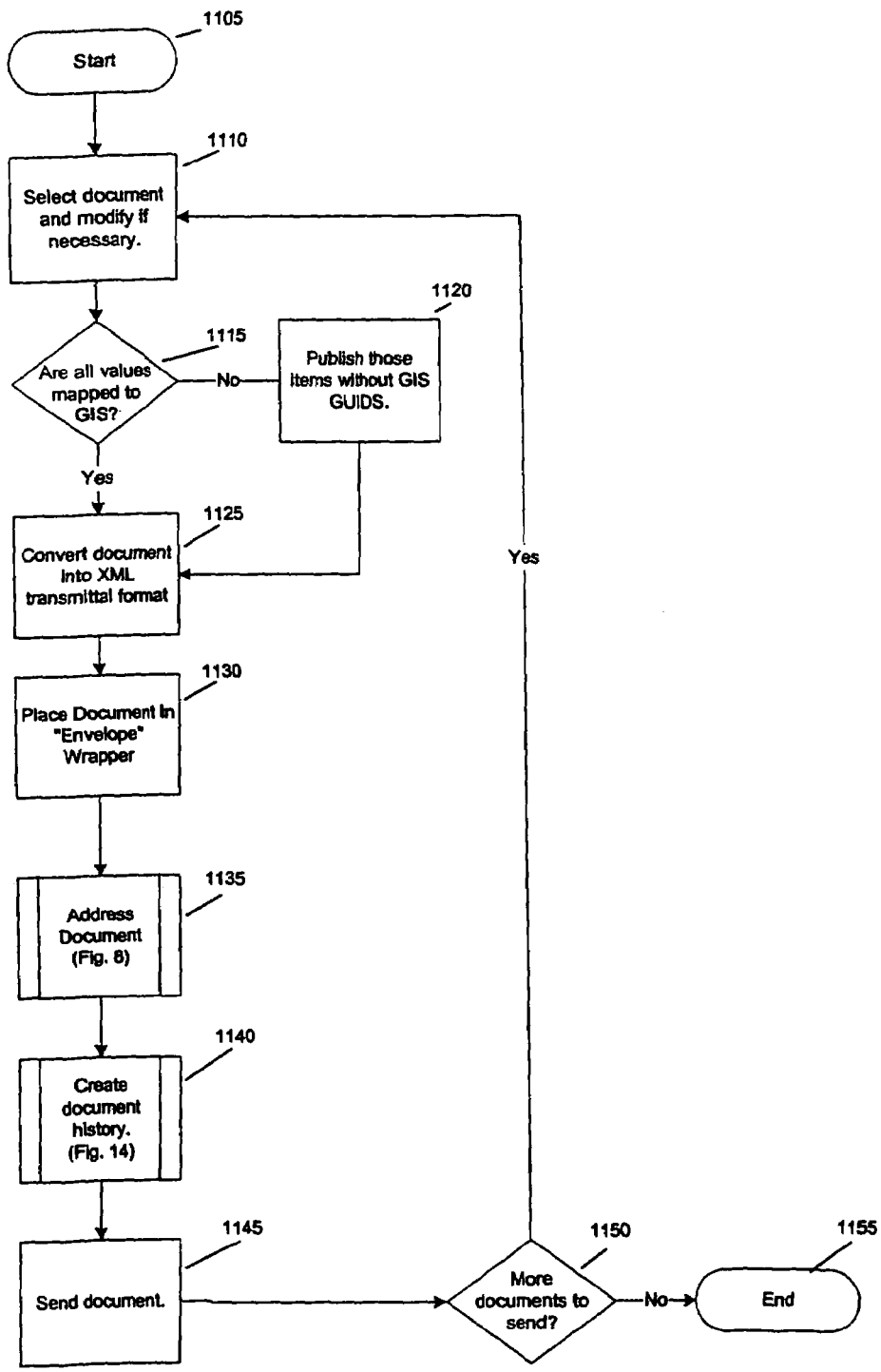
FIG. 11 is a logic flow diagram illustrating an exemplary process for sending documents and messages between collaborators via an ASP model.

FIG. 7B illustrates the computer-implemented process for routine 615. In step 735b, the client chooses which companies to invite to collaborate on the project. A company is invited to collaborate by sending the company a message or a document. The invitation is first addressed using routine 740b. Addressing is fully described in FIG. 8. Once the invitation is addressed, the invitation is sent according to routine 745b. FIG. 11 describes the processes involved in sending documents and messages.

Figure 8:
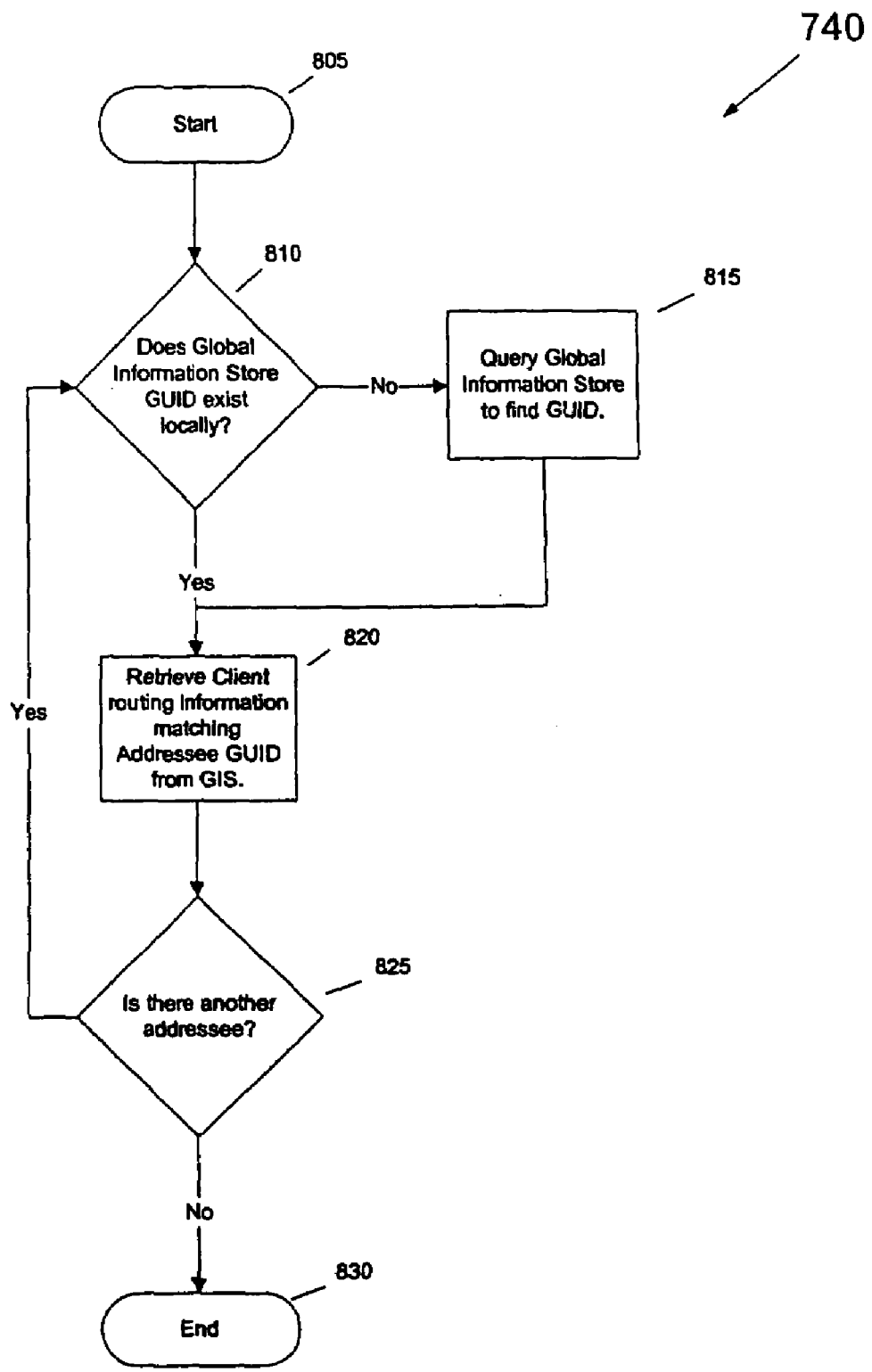
FIG. 8 is a logic flow diagram illustrating an exemplary process for addressing documents and messages to collaborators via an ASP model.

FIG. 8 illustrates a computer-implemented process for addressing documents and messages to be exchanged between collaborators on a project. FIG. 8 provides an overview for the addressing process 740, and begins with decision step 810. In decision step 810, the local presence or absence of a GUID returned from the GIS 415a or 415b for the addressee is determined by comparing locally stored data fields and GUIDs with the returned data fields and GUIDs. If the decision in step 810 is negative, then the "no" branch is followed to step 815. If the decision in step 810 is positive, then the "yes" branch is followed to step 820. In step 815 the GIS 415a or 415b is queried to find a GUID that matches the addressee. In step 820 routing information matching the addressee's GUID is retrieved from the GIS 415a or 415b. In decision step 825 a determination is made whether additional addressees are identified by the message or document to be exchange. If the result to decision step 825 is negative, the "no" branch is followed to step 830 and the addressing process 740. If the result of decision step 825 is positive, then the "yes" branch is followed to step 810 to repeat the addressing process 740 until all addressees have routing information placed in the document or message.

Figure 9:
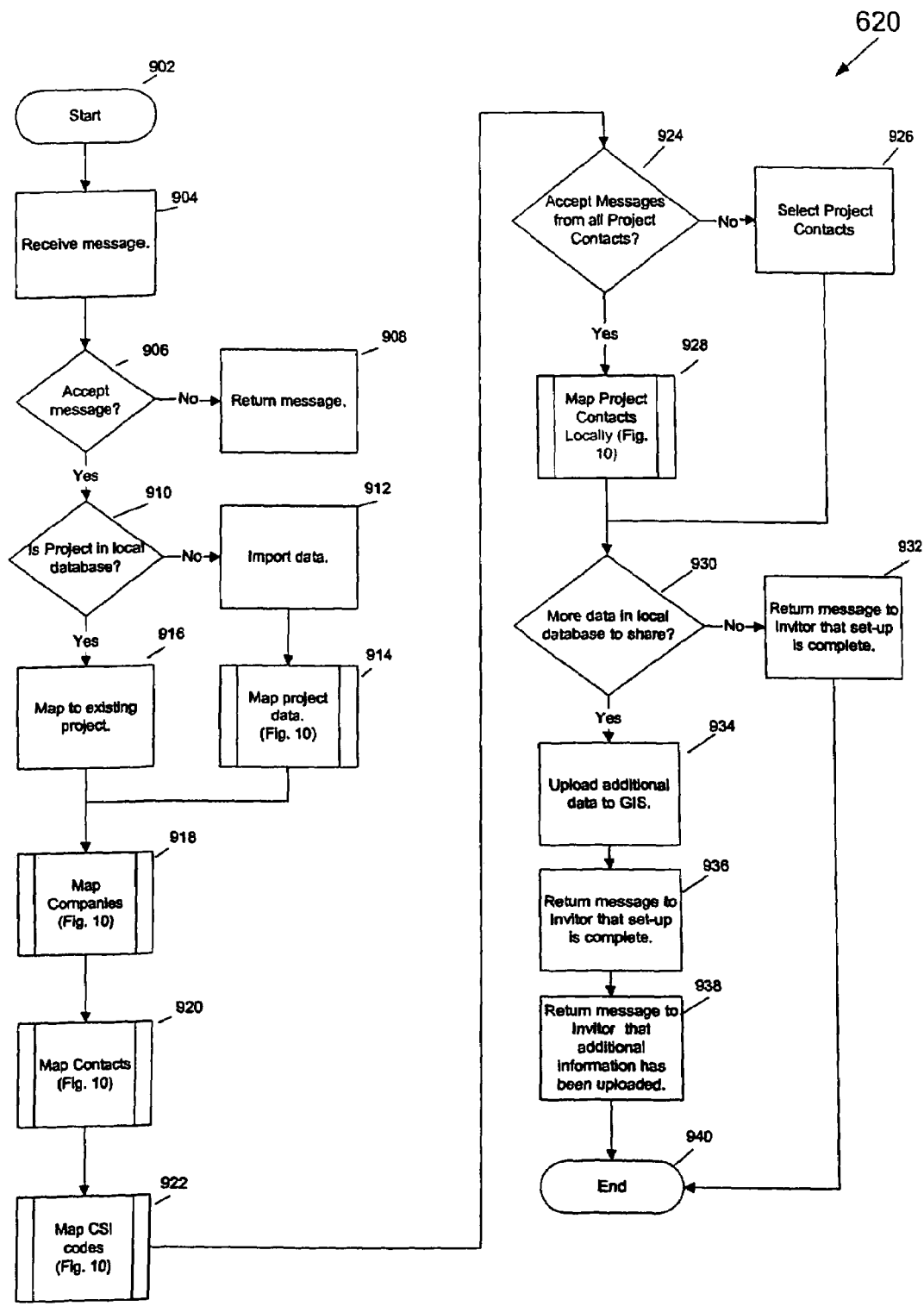
FIG. 9 is a logic flow diagram illustrating an exemplary process for responding to an invitation to collaborate on a project via an ASP model.

FIG. 9 illustrates a computer-implemented process for receiving a project invitation. Process 620 begins at the start step 902 and a message or document is received in step 904. At decision step 906 a decision is made whether to accept the message or document. If the result of decision 906 is negative, the "no" branch is followed to step 908. If the result of decision 906 is positive, the "yes" branch is followed to step 910. Step 908 involves returning the rejected message to the sender. In step 910 a decision is made whether the project identified by the invitation exists in the local database. If the result of decision 910 is negative, the "no" branch is followed to step 912. If the result of decision 910 is positive, the "yes" branch is followed to step 916.

In step 912 the client imports data for the project from the GIS 415a or 415b by accessing the Web server 410a or 410b. Data to be imported includes information specific to the project, companies associated with the project, contacts for the project, and CSI codes. Routine 914 encompasses mapping the imported data to existing local data using the GUID for each piece of data, as described in detail below in connection with FIG. 10. Companies, contacts, and CSI codes are mapped in routines 918, 920, and 922, respectively. The mapping process in routines 918, 920, and 922 is more fully described in process 1000 of FIG. 10. In routine 922, mapping of CSI codes overwrites data locally. Overwriting of data in routines 918 and 920 is not necessary.

Decision step 924 follows the routines for mapping project data. In decision 924 a determination is made whether to accept messages from all project contacts mapped in routine 920. If the result of decision 924 is negative, the "no" branch is followed to step 926. If the result of decision 924 is positive, the "yes" branch is followed to routine 928. In step 926 project contacts from whom messages will be accepted are selected. Decision 930 follows step 926. In routine 928 project contacts are mapped locally as described in process 1000.

A determination is made in decision 930 as to whether the individual receiving the invitation has additional information to share with the sender of the invitation. If the result of decision 930 is negative, the "no" branch is followed to step 932. If the result of decision 930 is positive, the "yes" branch is followed to step 934. In step 932, a message is sent to the invitor via the Internet 405a or 405b indicating that set-up is complete. In step 934 additional information such as additional project contacts is published to the GIS 415a or 415b. In step 936 a message is sent to the invitor indicating that additional information is available in the GIS 415a or 415b. Step 940 follows steps 932 and 938 and represents the end of process 900.

Figure 10:
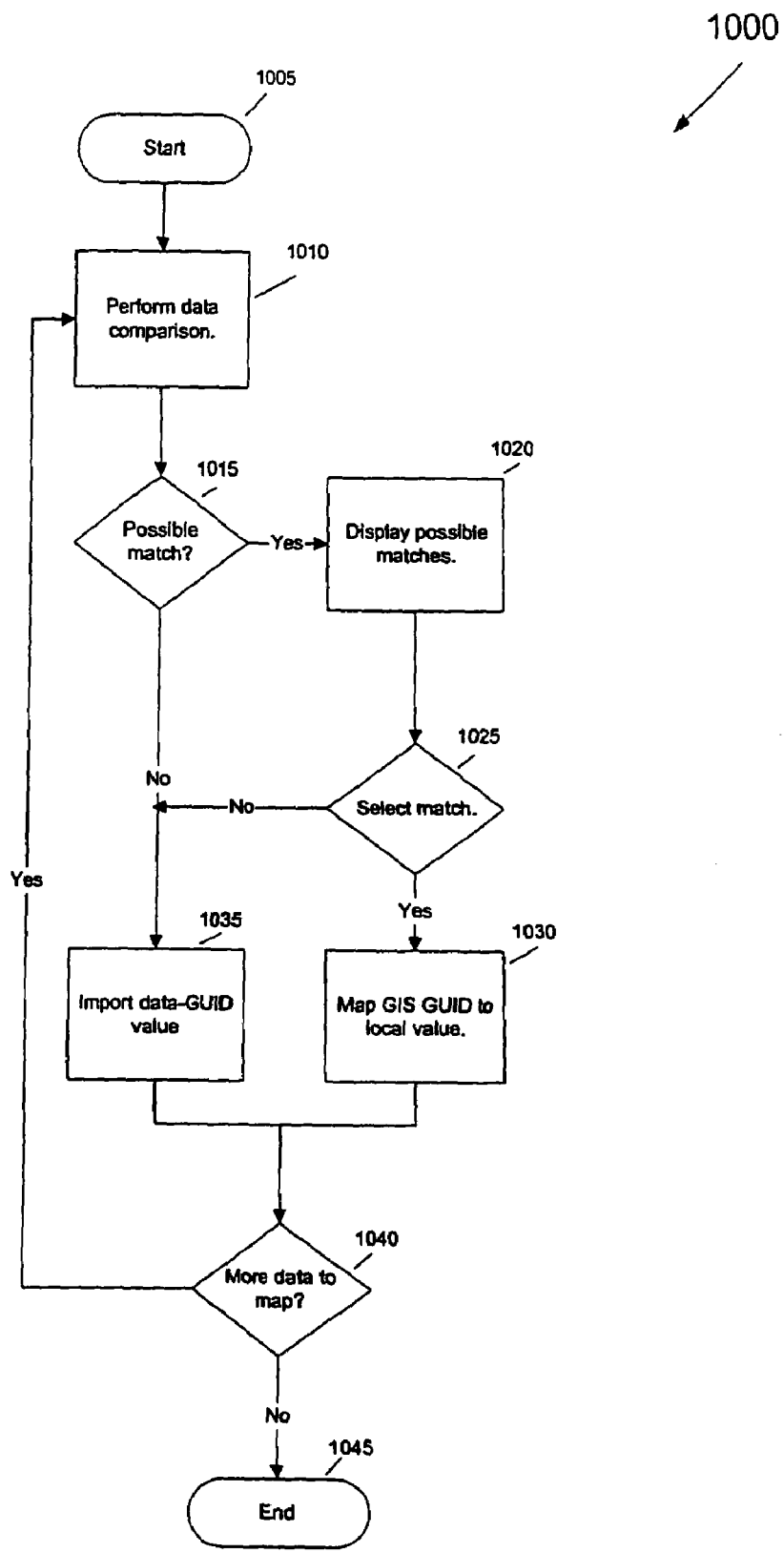
FIG. 10 is a logic flow diagram illustrating an exemplary process for mapping project data between databases in an ASP model.

FIG. 10 illustrates the computer-implemented process for routines 730, 914, 918, 920, and 922. FIG. 10 provides a logic flow diagram for process 1000 for mapping of data between databases. Process 1000 begins with start step 1005. In step 1010 a comparison is made between data retrieved from the GIS 415a or 415b and data on the local database 420a–445a. In decision step 1015 a determination is made whether possible matches exists between the local database and the GIS 415a or 415b. If the result of decision 1015 is negative, the "no" branch is followed to step 1035. If the result of decision 1015 is positive, the "yes" branch is followed to step 1020. In step 1035 the data and its associated GUID are imported locally by accessing the GIS via the Web server 410a or 410b. In step 1020 possible matches between the data in the GIS 415a or 415b and the local data are displayed to the user.

In decision step 1025, a decision is made whether to select a possible match between the displayed data matches and the local data. If the result of decision 1025 is negative, the "no" branch is followed to step 1035. If the result of decision 1025 is positive, the "yes" branch is followed to step 1030. In step 1030 the GUID value associated with the selected match is associated with the local data. In decision step 1040, a determination whether additional data exists that must be mapped is made. If the result of decision 1040 is negative, the "no" branch is followed to step 1045 signifying the end of process 1000. If the result of decision 1040 is positive, the "yes" branch is followed to step 1010 and process 1000 is repeated until no more data requires mapping.

FIG. 11 is an exemplary logic flow diagram for process 745 for sending messages or documents to collaborators. Process 745 begins with start step 1105. In step 1110 a message or document is selected by a client. The message or document can be an existing message or document that has been received. Alternatively, the selected message or document can be newly created or can be an edited version of an existing document. Messages or documents are assigned a GUID when created. Existing messages or documents without GUIDs are assigned GUIDs when sent to the addressee. Messages or documents contain data fields that are assigned locally at the client computer. Examples of local data fields include contacts, project, company, and status. In decision 1115 the data values corresponding to data fields in the document are checked to determine whether a GUID exists for each data field in the GIS 415a or 415b. If the result of decision 1115 is negative, the "no" branch is followed to step 1120. If the result of decision 1115 is positive, the "yes" branch is followed to step 1125.

In step 1120 a client publishes data fields in the message or document that do not have a corresponding GUID to the GIS 415a or 415b, and each data field is associated with a GUID. Publishing includes sending the data and the corresponding contextual information to the GIS by the client. A GUID is inserted locally for each data field in the message or document. In step 1125 the message or document is converted into XML transmittal format by the client computer. Those of ordinary skill in the art will recognize that the message or document can be converted into any format suitable for electronic transmittal. Alternatively, the message or document may be encrypted prior to transmission. Step 1130 is next, and the message or document is placed in an "envelope" wrapper. Those of ordinary skill in the art will understand that the message or document can be packaged with any suitable method for transmission such that the integrity of the message or document is preserved during transmission. For example, messages or documents can be packaged using protocols known in the art such as the Transmission Control Protocol (TCP) and the Internet Protocol (IP).

After the message or document is packaged, the message or document is addressed in routine 1135. Addressing is described in more detail in process 740. In one example, the GUID associated with the addressee company is matched against the GUID in the GIS. The routing information associated with the GUID in the GIS is returned locally and inserted into the document or message. In routine 1140 a document history is initiated. Routine 1140 is more fully illustrated in FIG. 14. In step 1145 the message or document is transmitted to the addressee. In decision step 1150 a determination whether more messages or documents are to be sent is made by the client. If the result of decision 1150 is negative, the "no" branch is followed to step 1155 which represents the end of process 1100. If the result of decision 1150 is positive, the "yes" branch is followed to step 1110 and process 1100 is repeated until no more messages or documents are to be sent.

Figure 12:
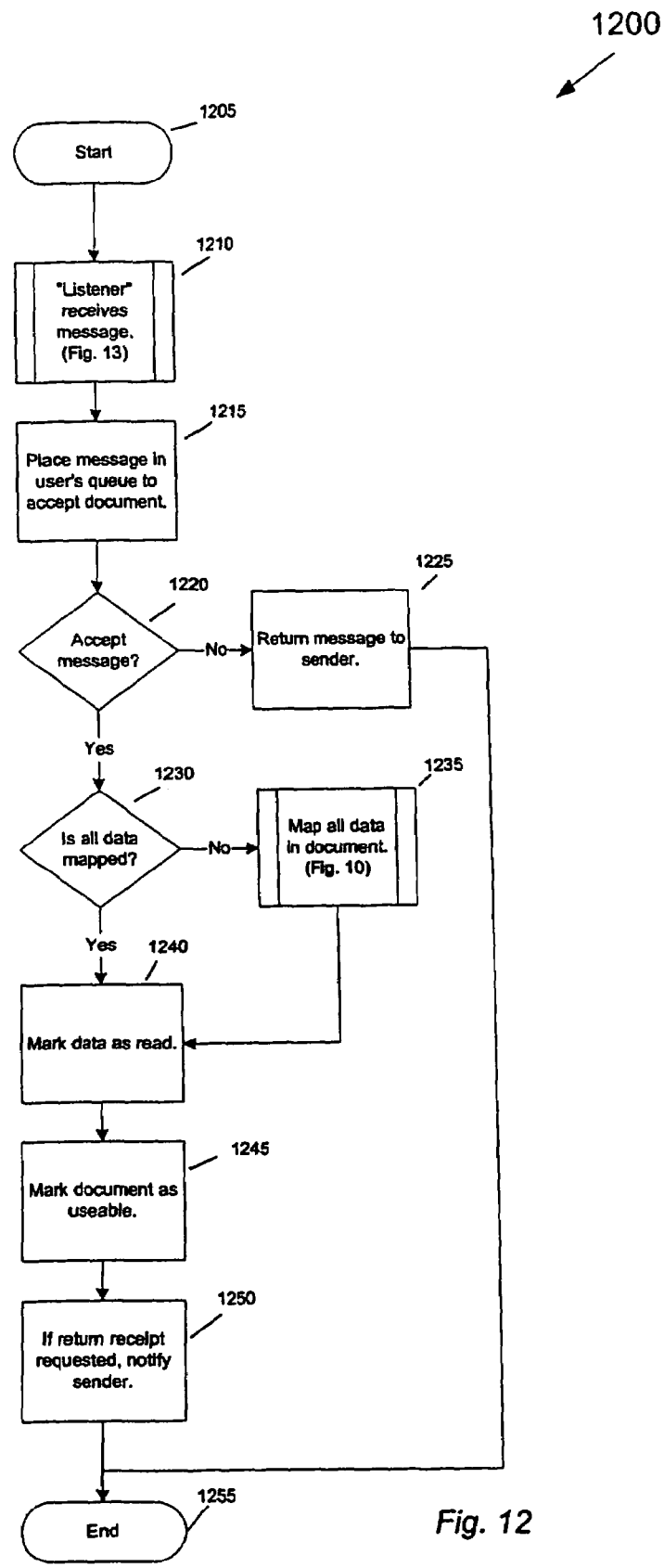
FIG. 12 is a logic flow diagram illustrating an exemplary process for receiving documents or messages via an ASP model.

FIG. 12 is a logic flow diagram of an exemplary process 1200 for receiving documents or messages. Process 1200 begins with start step 1205. In routine 1210 a "listener" receives a message or document addressed to a project collaborator. Routine 1210 is described in detail in process 1300 of FIG. 13. A "listener" can be any computer or computer process for receiving electronically transmitted messages or documents and extracting the message or document from the electronic packaging necessary for transmission. In step 1215 the message or document is placed in the addressee's queue to accept the document. In decision step 1220 the message or document is accepted or rejected by the client computer. If the result of decision step 1220 is negative, the "no" branch is followed to step 1225. If the result of decision step 1220 is positive, the "yes" branch is followed to decision step 1230. In step 1225, the rejected message or document is returned to the sender. Step 1255 follows step 1225 and represents the end of process 1200. In decision step 1230, the client computer checks the data in the message or document to determine if all the data fields have a GUID that is matched locally. If the result of decision step 1230 is negative, the "no" branch is followed to routine 1235. If the result of decision step 1230 is positive, the "yes" branch is followed to step 1240.

In routine 1235 all the data in the document is mapped locally as described in process 1000. In step 1240 the data in the message or document is marked as "read." Next, the document is marked as "useable" in step 1245. If return receipt is requested, the sender is notified of receipt in step 1250. Step 1255 follows step 1245 and represents the end of process 1200.

Figure 13:
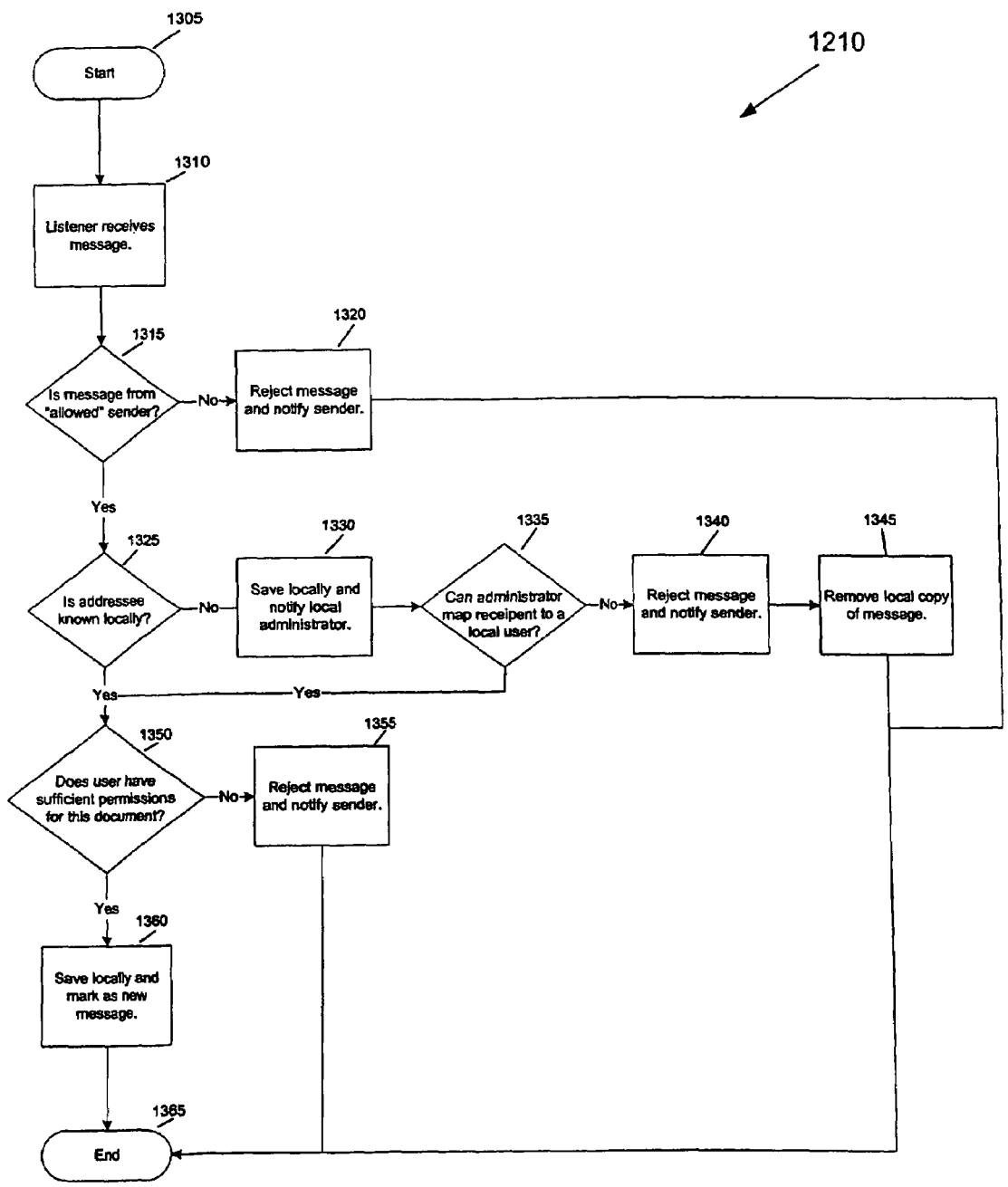
FIG. 13 is a logic flow diagram illustrating an exemplary process for processing a received message in and ASP model.

FIG. 13 is a logic flow diagram of an exemplary process for processing a received message, process 1210. The first step of process 1210 is step 1310. In step 1310 a "listener" receives the message or document. In decision step 1315 a determination is made as to whether the message is from an "allowed" sender. An "allowed" sender is a sender that the receiver has selected from whom to receive messages. If the result of decision step 1315 is negative, the "no" branch is followed to step 1320. If the result of decision 1315 is positive, the "yes" branch is followed to step 1325. In step 1320 the message is rejected and the sender is notified. In decision step 1325, a determination is made whether the addressee is known locally. If the result of the decision step 1325 is negative, the "no" branch is followed to step 1330. If the result of decision 1325 is positive, the "yes" branch is followed to decision 1350. In step 1330 the message or document is saved locally and the local administrator is notified that a message of document with an unknown address has been received.

In decision 1335 the system administrator determines whether the unknown address can be matched to a local user. If the result of decision 1335 is negative, the "no" branch is followed to step 1340. If the result of decision 1335 is positive, the "yes" branch is followed to decision 1350. In step 1340 the message or document is rejected and the sender is notified of the rejection. The saved copy of the message or document is then removed in step 1345, and step 1365 representing the end of the routine follows. In decision 1350 a determination is made as to whether the user or addressee has sufficient permissions to receive the sent message or document. If the result of decision 1350 is negative, the "no" branch is followed to step 1355. If the result of decision 1350 is positive, the "yes" branch is followed to step 1360. In step 1355 the message or document is rejected and the sender is notified. In step 1360 the message or document is saved locally and is marked as a new message or document. Step 1365 follows and represents the end of process 1300.

Figure 14:
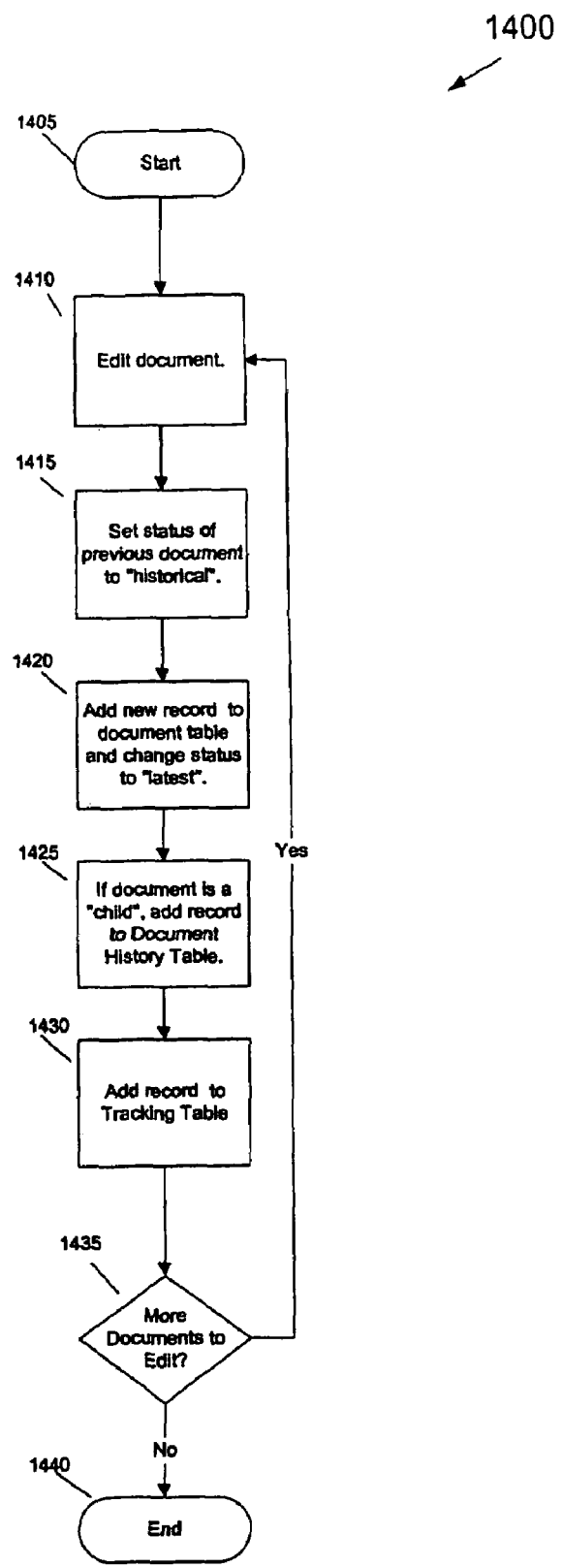
FIG. 14 is a logic flow diagram illustrating an exemplary process for tracking edits in documents and messages exchanged between collaborators in an ASP model.

FIG. 14 is a logic flow diagram of an exemplary process 1400 for tracking changes in documents and messages exchanged between collaborators. Process 1400 begins with start step 1405. In step 1410 an existing document is edited. Exemplary project messages or documents contain document tables corresponding to the specific type of message or document. Exemplary project documents in the construction industry include Request For Information (RFI), Meetings, and Submittals.

In step 1415 the status of the original unedited message or document is set to "historical." In step 1420 a new record is added to a document table and the status is changed to "latest." The new record records the change to the document, who changed the document, and when the document was changed. When a document is changed, the HistoryID is incremented. Some documents or messages are specifically related to one another in that they are generated in response to or for the "parent" document. An example of such compound documents occurs with meetings. A compound document is a document represented in the database by a parent table and one or more child tables. A record of a meeting may be related to a record of attendance for that meeting as well as a record of minutes of the meeting. In step 1425 a record is added to the Document History Table if a message or document is a "child", i.e., related, to another document. The overall history for a compound document is maintained in a document history table. History Field changes in parent documents apply to every child table. Whenever a change is made in any part of a compound document, a new record is also added to this table.

In step 1435, a record is added to a Tracking Table. A Tracking Table tracks information about documents sent and received and is updated whenever an action is taken on a particular document. Exemplary actions include actions involving communication between different clients including: Sent To, Receive From, Respond To, Received Receipt, Read Receipt.

In decision step 1435, a determination is made as to whether more documents are to be edited. If the result of decision step 1435 is negative, the "no" branch is followed to step 1440, the end. If the result of decision step 1435 is positive, the "yes" branch is followed to step 1410 and process 1400 is repeated until no more documents are to be edited.

The full history of a document can be retrieved by querying the system. The results of the query can be displayed to the user.

The history functionality can be illustrated in the context of a meeting between collaborators on a project in the construction industry. Initially, a document entitled Meetings is created by collaborator. As with any meeting, attendance and minutes can be taken. In this example, attendance and minutes would exists as separate documents that are connected to the Meetings document, the parent document. To track the history of the meeting as well as associated documents such as attendance and minutes, a table entitled Meeting History is added to the Meetings document. Each document has a table associated with each document, and each parent document has a field in its document table for each child document. Child documents of Meetings include MtgAttendance, Minutes, and MinutesResp.

When a meetings document is created, the fields listed in Table 1 are added to the Meetings Table.

TABLE 1

| Meetings | Data Type |
| --- | --- |
| MeetingHistoryID | Int, auto incr. |
| MtgGUID | Uniqueidentifier |
| HistoryActionID | Int |
| HistoryUserID | Int |
| HistoryTimestamp | Timestamp |
| HistoryStatus | Char(1) |

The field "MeetingHistoryID" is incremented whenever the Meeting document is altered or acted upon. The field "MtgGUID" is the GUID that identifies the meeting and remains constant throughout alterations. The field "HistoryActionID" identifies the type of action taken on the document. The field "HistoryUserID" identifiers the client changing the document. The field "HistoryTimestamp" marks the time the change was made to the document, and the "HistoryStatus" field identifies whether this is the latest version of the document. These fields enable a history trail to be generated that will identify who edited the document, when the document was edited, when the document was edited, and whether the document is the latest version. The history trail is generated by extracting the data in these fields and displaying the data to a user.

The attendance for the meeting may be recorded in a document called MtgAttendance. When an attendee is added to the meeting, a record is added to the MtgAttendance Table. The MtgAttendance document contains a MtgAttendance table. The fields listed in Table 2 are added the MtgAttendance table.

TABLE 2

| MtgAttendence | Data Type |
| --- | --- |
| MtgAttendanceID | Int, auto incr. |
| MtgAttendanceGUID | Uniqueidentifier |
| HistoryActionID | Int |
| HistoryUserID | Int |
| HistoryTimestamp | Timestamp |
| HistoryStatus | Char(1) |

These added fields parallel the fields added to the Meetings Table, but are specific for the document MtgAttendance.

Similarly, when a minutes document is created, the fields listed in Table 3 are added to the Minutes table.

TABLE 3

| Minutes | Data Type |
| --- | --- |
| MinuteHistoryID | Int, auto incr. |
| MinuteGUID | Uniqueidentifier |
| HistoryActionID | Int |
| HistoryUserID | Int |
| HistoryTimestamp | Timestamp |
| HistoryStatus | Char(1) |

The added fields in Table 3: HistoryID, GUID, HistoryActionID, HistoryUserID, HistoryTimestamp, and HistoryStatus are similar to the fields listed in Tables 1 and 2 above and serve the same purposes but are specific for this document.

The following table MeetingHistory demonstrates how the MeetingHistory Table is updated when various parts of a meeting are added and edited. This example does not include all fields that are in the Table such as Action, UserID, Timestamp, and TableID. For each record in MeetingHistory, the system also updates the individual tables Meeting, MtgAttendance, Minutes, and MinutesResp.

TABLE 4

| | | MeetingHistory | | |
| --- | --- | --- | --- | --- |
| Total MtgHistID | MtgID | MtgHistID | MtgAttHistIDs | MtgMinHistIDs |
| 45 | 92 | 899 | | |
| 46 | 92 | 899 | 106 | |
| 47 | 92 | 899 | 106, 107 | |
| 48 | 92 | 899 | 106, 107 | 343 |
| 49 | 78 | 686 | 55, 61, 62 | 222, 223 |
| 50 | 78 | 686 | 55, 61, 62 | 222, 223 |
| 51 | 78 | 686 | 55, 61, 62 | 222, 223 |
| 52 | 92 | 899 | 106, 107 | 343 |
| 53 | 92 | 1002 | 106, 107 | 343 |
| 54 | 92 | 1002 | 107 | 343 |

Table 4 has entries for two separate meetings, identified by MtgIDs 92 and 78. In record 45, the user created meeting 92. In record, 46, the user added an attendee to the meeting by creating a Meeting Attendance document given a MtgAttHistID of 106. In record 47, the user added another attendee to the meeting which is evidence by the addition of a record termed MtgAttHistID 107. Records 49–51 concern a different meeting as evidenced by different MtgID, 78 rather than 92. By record 52, the original meeting, MtgID 92, has two attendees, evidenced by records 106 and 107, and one minute, record 343. Record 53 shows a change in the MtgHistID from 899 to 1002 indicating that the document Meeting was edited or acted upon.

Using the information from the table Meeting History, a History Log for the meeting identified as MtgID 92 can be generated as follows. This History Log can be displayed to a client allowing the client to ascertain the status of meeting, project or document.

TABLE 5

History Log

| TotalMtgHist ID | Time | Company | User | Action | # Att. | # Min. | # Min. Resp. |
|---|---|---|---|---|---|---|---|
| 45 | Aug. 16, 2000 16:05:16 | XYZ | Smith, Joe | Created Meeting | 0 | 0 | 0 |
| 46 | Aug. 16, 2000 16:07:39 | XYZ | Smith, Joe | Added Attendee | 1 | 0 | 0 |
| 47 | Aug. 16, 2000 16:08:15 | XYZ | Smith, Joe | Added Attendee | 2 | 0 | 0 |
| 48 | Aug. 17, 2000 07:48:22 | ABC | Doe, John | Added Minute | 2 | 1 | 0 |
| 52 | Aug. 17, 2000 07:49:04 | ABC | Doe, John | Added Min. Resp. | 2 | 1 | 1 |
| 53 | Aug. 18, 2000 13:35:46 | EZT | Cook, Mike | Edited Meeting | 2 | 1 | 1 |
| 54 | Aug. 18, 2000 13:35:59 | EZT | Cook, Mike | Deleted Attendee | 1 | 1 | 1 |

While the present invention may be employed to exchange messages and documents and facilitate collaboration in the construction industry as described in the illustrative embodiments, the invention is not limited to this application and can be used in other industries that require collaboration on projects. For example, the present invention can be used to facilitate collaboration on projects in sales, product development, and scientific research.

It should be understood that the foregoing relates only to illustrative embodiments of the present invention, and that numerous changes may be made therein without departing from the spirit and scope of the invention as defined by the following claims.

What is claimed is:

1. A method for using a distributed computer network to facilitate collaboration between clients working on a common project, wherein the distributed computer network comprises client databases and a central database, said method comprising the steps of:

publishing project specific data in a plurality of project data fields to the central database;

assigning a global unique identifier to each project data field of the plurality of project data fields;

mapping the global unique identifier for each project data field to an associated local data field for the project specific data maintained in the client databases; and exchanging information related to the common project between the client databases, wherein the exchanged information is matched to the associated local data field maintained in the client databases based upon each global unique identifier, said exchanging step comprising the steps of:

selecting information to exchange between a first client database and a second client database, wherein the information comprises a plurality of local data fields maintained in the first client database;

determining whether each local data field of the plurality of local data fields maintained in the first client database is associated with a respective global unique identifier;

in the event that a global unique identifier is not associated with each local data field, obtaining a global unique identifier for each local data field without an associated global unique identifier;

mapping the global unique identifier obtained in said obtaining step to a respective local data field maintained in the first client database; and transmitting the information from the first client database to the second client database, wherein each local data field in the transmitted information is matched to a corresponding local data field maintained in the second client database based upon the respective global unique identifier.

2. A method according to claim 1, further comprising the step of obtaining from the central database addressing information associated with the second client database, wherein the information is transmitted from the first client database to the second client database according to the addressing information.

3. A method according to claim 1, wherein said exchanging step further comprises the steps of:

receiving by the second client database the information transmitted in said transmitting step, wherein the information comprises a respective global unique identifier associated with each local data field maintained in the first client database;

determining whether each respective global unique identifier is associated with a local data field maintained in the second client database; and in the event that a global unique identifier is not associated with a local data field maintained in the second client database, mapping the respective global unique identifier without an associated local data field maintained in the second client database to a local data field maintained in the second client database.

4. A method according to claim 1, wherein the information exchanged in said exchanging step is not stored in the central database.

5. A method according to claim 1, further comprising the step of storing confidential information for a specific client on a specific client database connected to the central database of the distributed computer network, wherein the specific client retains ownership of the confidential information stored on the specific client database.

6. A method according to claim 1, wherein said exchanging step comprises exchanging information related to a plurality of common projects between the client databases.

7. A method according to claim 1, further comprising the step of storing the global unique identifier for each project data field in the central database.

8. A method according to claim 1, further comprising the steps of:
   sending an invitation from the first client database to invite a second client to collaborate on the common project; and
   responding to the invitation at the second client database by one of accepting or rejecting the invitation.

9. A method according to claim 1, wherein said mapping step comprises the steps of:
   comparing a particular local data field maintained in a particular client database to a particular project data field published in the central database;
   determining if the particular local data field corresponds to the particular project data field based on a result of said comparing step; and
   in the event that the particular local data field corresponds to the particular project data field, assigning the global unique identifier associated with the particular project data field to the particular local data field.

10. A method according to claim 9, further comprising the step of importing the particular project data field and its assigned global unique identifier into the particular client database, in response to a determination that the particular local data field does not correspond to the particular project data field.

11. A method according to claim 1, further comprising the step of tracking changes to information exchanged between the client databases to determine whether an old version of the information and a new version of the information exist.

12. A method according to claim 11, wherein said tracking step comprises the steps of:
   recording tracked changes to the information in a document table, wherein the document table includes data associated with the old version and the new version; and
   setting a status in the document table if the old version is outdated.

13. A method according to claim 12, wherein said recording step comprises the step of associating the old version and the new version with a document history table when the old version and the new version are part of a family of documents, wherein the document history table stores data indicating changes made to each document in the family of documents.

14. A method for using a distributed computer network to facilitate the exchanging of information between clients in the construction industry, wherein the distributed computer network comprises client databases and a central database, said method comprising the steps of:
   storing an electronic document in one of the client databases, the electronic document having a plurality of data fields each containing information to be shared;
   publishing the data fields of the electronic document to the central database;
   assigning by the central database a global unique identifier to each data field of the plurality of data fields in the electronic document;
   storing in the central database each assigned global unique identifier;
   mapping each assigned global unique identifier to an associated local data field maintained in the client databases, said mapping step comprising the step of:
      comparing a particular local data field in a particular client database to a particular data field of the electronic document published in the central database;
      determining if the particular local data field corresponds to the particular data field of the electronic document, based on a result of said comparing step; and
      in the event that the particular local data field corresponds to the particular data field of the electronic document, assigning the global unique identifier assigned to the particular data field of the electronic document to the particular local data field; and
   exchanging between the client databases the information contained in the electronic document, wherein the exchanged information is matched to the associated local data field maintained in the client databases based upon each assigned global unique identifier.

15. A method according to claim 14, further comprising the step of importing the particular data field of the electronic document and its assigned global unique identifier into the particular client database, in response to a determination that the particular local data field does not correspond to the particular data field of the electronic document.

16. A method according to claim 15, further comprising the step of storing confidential information for a specific client on a specific client database connected to the central database of the distributed computer network,
   wherein the specific client retains ownership of the confidential information stored on the specific client database.

17. A method according to claim 15, further comprising the step of tracking changes to information exchanged between the client databases to determine whether an old version of the information and a new version of the information exist.

18. A method according to claim 17, wherein said tracking step comprises the step of recording tracked changes to the information in a document table, wherein the document table includes data associated with the old version and the new version.

19. A method according to claim 18, wherein said tracking step comprises the step of setting a status in the document table if the old version is outdated.

20. A method according to claim 14, wherein said exchanging step comprises the steps of:
   selecting information to exchange between a first client database and a second client database, wherein the information comprises a plurality of local data fields maintained in the first client database;
   determining whether each local data field of the plurality of local data fields maintained in the first client database is associated with a respective global unique identifier;
   in the event that a global unique identifier is not associated with each local data field, obtaining a global unique identifier for each local data field without an associated global unique identifier;
   mapping the global unique identifier obtained in said obtaining step to a respective local data field maintained in the first client database; and
   transmitting the information from the first client database to the second client database, wherein each local data field in the transmitted information is matched to a corresponding local data field maintained in the second client database based upon the respective global unique identifier.

21. A method according to claim 20, wherein said exchanging step further comprises the steps of:
- receiving by the second client database the information transmitted in said transmitting step, wherein the information comprises a respective global unique identifier associated with each local data field maintained in the first client database;
- determining whether each respective global unique identifier is associated with a local data field maintained in the second client database; and
- in the event that a global unique identifier is not associated with a local data field maintained in the second client database, mapping the respective global unique identifier without an associated local data field maintained in the second client database to a local data field maintained in the second client database.

22. A method for using a distributed computer network to facilitate collaboration between clients working on a common project, wherein the distributed computer network comprises client databases and a central database, said method comprising the steps of:
- publishing project specific data in a plurality of project data fields to the central database;
- assigning a global unique identifier to each project data field of the plurality of project data fields;
- mapping the global unique identifier for each project data field to an associated local data field for the project specific data maintained in the client databases, wherein said mapping step comprises the steps of:
  - comparing a particular local data field maintained in particular client database to a particular project data field published in the central database;
  - determining if the particular local data field corresponds to the particular project data field based on a result of said comparing step;
  - in the event that the particular local data field corresponds to the particular project data field, assigning the global unique identifier associated with the particular project data field to the particular local data field; and
  - importing the particular project data field and its assigned global unique identifier into the particular client database, in response to a determination that the particular local data field does not correspond to the particular project data field; and
- exchanging information related to the common project between the client databases, wherein the exchanged information is matched to the associated local data field maintained in the client databases based upon each global unique identifier.

23. A method according to claim 22, wherein said exchanging step comprises the steps of:
- selecting information to exchange between a first client database and a second client database, wherein the information comprises a plurality of local data fields maintained in the first client database, and wherein each local data field in the first client database is associated with a respective global unique identifier; and
- transmitting the information from the first client database to the second client database, wherein the transmitted information is matched to a corresponding local data field maintained in the second client database based upon the respective global unique identifier associated with each local data field maintained in the first client database.

24. A method according to claim 23, further comprising the step of obtaining from the central database addressing information associated with the second client database, wherein the information is transmitted from the first client database to the second client database according to the addressing information.

25. A method according to claim 22, wherein said exchanging step comprises the steps of:
- selecting information to exchange between a first client database and a second client database, wherein the information comprises a plurality of local data fields maintained in the first client database;
- determining whether each local data field of the plurality of local data fields maintained in the first client database is associated with a respective global unique identifier;
- in the event that a global unique identifier is not associated with each local data field, obtaining a global unique identifier for each local data field without an associated global unique identifier;
- mapping the global unique identifier obtained in said obtaining step to a respective local data field maintained in the first client database; and
- transmitting the information from the first client database to the second client database, wherein each local data field in the transmitted information is matched to a corresponding local data field maintained in the second client database based upon the respective global unique identifier.

26. A method according to claim 25, wherein said exchanging step further comprises the steps of:
- receiving by the second client database the information transmitted in said transmitting step, wherein the information comprises a respective global unique identifier associated with each local data field maintained in the first client database;
- determining whether each respective global unique identifier is associated with a local data field maintained in the second client database; and
- in the event that a global unique identifier is not associated with a local data field maintained in the second client database, mapping the respective global unique identifier without an associated local data field maintained in the second client database to a local data field maintained in the second client database.

27. A method according to claim 22, wherein said exchanging step further comprises exchanging the information without storing the information in the central database.

28. A method according to claim 22, further comprising the step of storing confidential information for a specific client on a specific client database connected to the central database of the distributed computer network,
- wherein the specific client retains ownership of the confidential information stored on the specific client database.

29. A method according to claim 22, wherein said exchanging step comprises exchanging information related to a plurality of common projects between the client databases.

30. A method according to claim 22, further comprising the step of storing the global unique identifier for each project data field in the central database.

31. A method according to claim 22, further comprising the steps of:
- sending an invitation from a first one of the client databases to invite a second client to collaborate on the common project; and responding to the invitation at a second one of the client databases by one of accepting or rejecting the invitation.

32. A method according to claim 22, further comprising the step of tracking changes to information exchanged between the client databases to determine whether an old version of the information and a new version of the information exist.

33. A method according to claim 32, wherein said tracking step comprises the steps of:

recording tracked changes to the information in a document table, wherein the document table includes data associated with the old version and the new version; and setting a status in the document table if the old version is outdated.

34. A method according to claim 33, wherein said recording step comprises the step of associating the old version and the new version with a document history table when the old version and the new version are part of a family of documents, wherein the document history table stores data indicating changes made to each document in the family of documents.

* * * * *

UNITED STATES PATENT AND TRADEMARK OFFICE
CERTIFICATE OF CORRECTION

| | |
|---|---|
| PATENT NO. | : 6,952,717 B1 |
| DATED | : October 4, 2005 |
| INVENTOR(S) | : Dushan G. Monchilovich et al. |

It is certified that error appears in the above-identified patent and that said Letters Patent is hereby corrected as shown below:

<u>Column 18,</u>
Lines 25 and 32, "claim 15" should read -- claim 14 --.

Signed and Sealed this

Thirteenth Day of December, 2005

JON W. DUDAS
*Director of the United States Patent and Trademark Office*